3,415,617
METHOD OF SEPARATING MAGNESIUM AND CALCIUM VALUES FROM CALCIUM AND MAGNESIUM CARBONATES

Ivan M. Thompson and John Maskal, Ludington, Mich., assignors to The Dow Chemical Company, Midland, Mich., a corporation of Delaware
No Drawing. Filed Feb. 2, 1966, Ser. No. 524,482
8 Claims. (Cl. 23—85)

ABSTRACT OF THE DISCLOSURE

The present invention relates to a method of separating the magnesium and calcium values from materials containing magnesium and calcium carbonates which comprises calcining crushed magnesium and calcium carbonate containing material, slaking at least the CaO portion of the resulting calcined material to form $$Ca(OH)_2$$

reacting the slaked material with a $CaCl_2$ solution to form calcium oxychloride crystals which are separable from the smaller MgO and $Mg(OH)_2$ crystals. The method of the present invention includes the further step of contacting the calcium oxychloride so formed with a $MgCl_2$ containing brine thereby to produce a high purity $$Mg(OH)_2$$

---

This invention relates to the recovery of magnesium and calcium values from materials consisting essentially of calcium and magnesium carbonates, and more particularly concerns a novel method of recovering and seprating magnesium and calcium present in dolomite, including a method of preparing magnesium hydroxide employing said recovered calcium values as a precipitant.

The mineral dolomite, which is an abundant and substantially equimolar mixture of magnesium and calcium carbonates, is a potential source of relatively pure calcium and magnesium products.

There are various methods known to the art for separating magnesium and calcium values from dolomite. For example, calcined dolomite (hereinafter called dolime) may be reacted with magnesium chloride-containing brines to form insoluble megnesium hydroxide $$(Mg(OH)_2)$$

and calcium chloride ($CaCl_2$). Another method concerns the carbonation of slaked dolime to form soluble $$Mg(HCO_3)_2$$

magnesium bicarbonate, which can be separated from the insoluble calcium carbonate ($CaCO_3$). Still another such method involves the high temperature calcination of dolomite with silica followed by separation of the magnesia from the disrupted mass. In addition, there are separations based on differences in specific gravity and rates of hydration of the oxides, and separations based on increasing the lime solubility by saccharate or phenolate compound formation. Each of these processes display, however, one or more of the following disadvantages: (a) The magnesium chloride-containing brines usually contain soluble boron compounds. This boron carries over in many cases to contaminate the magnesium values to be recovered. (b) Excessive and expensive handling of large volumes of liquids is required together with complex equipment installations and use of costly reagents. Incomplete separations are obtained resulting in impure products.

A primary object of the present invention is to provide a new and novel method of separating and recovering high purity calcium and magnesium values from magnesium and calcium carbonate-containing materials, such as, for example, from dolomite.

Another object of the invention is to provide a high density magnesium oxide product low in boron impurity.

A further object of the invention is to provide a low boron impurity-containing feed for processing in a kiln.

The novel method of the present invention for separating calcium and magnesium values from dolomite and the like comprises in general; providing a material consisting essentially of calcium carbonate and magnesium carbonate, such as, for example, dolomite, in a crushed or particulated form; calcining said material to the oxides of magnesium and calcium (called dolime); slaking said dolime to hydrate at least the calcium oxide (CaO) portion thereof to calcium hydroxide ($Ca(OH)_2$); reacting the slaked dolime with a concentrated $CaCl_2$ solution in a slurried reaction mass, thereby forming filterable crystals of calcium oxychloride hydrate in an aqueous $CaCl_2$ phase, said phase also containing filterable but smaller crystals of MgO and $Mg(OH)_2$. The crystals of MgO and $Mg(OH)_2$ are as aforesaid separably smaller than said calcium oxychloride hydrate crystals. The calcium oxychloride crystals are then separated from the liquid phase containing the smaller MgO and $$Mg(OH)_2$$

crystals, whereupon, the magnesium values are separated from the liquid phase. Any magnesium oxide not converted to magnesium hydroxide during the sequence of steps of the present process may, if desired, be slaked as a subsequent step at elevated temperatures in agitated holding tanks to homogenize the magnesium values.

In practice, the slaked dolime material is classified or sieved as to size to remove undesirably large particles and impurities therefrom before reacting it with the concentrated calcium chloride solution. These particles and impurities in general comprise silicate and metal oxide impurities, and unburned limestone cores.

The separation of the oxychloride crystals from the liquid phase containing the smaller MgO and $Mg(OH)_2$ crystals may be accomplished, for example, by conventional crystal size classification means. Similarly, the magnesium oxide and hydroxide crystals may be recovered from the calcium chloride-containing liquid phase as by filtration, whereupon, the crystals so-recovered may be rendered substantially free of soluble impurities, such as, for example, of calcium chloride, by washing one or more times in water or in other suitable wash solutions. The calcium oxychloride crystals are washed with a calcium chloride aqueous solution.

The magnesium and calcium values so-separated and washed are of high purity. These values so-obtained may be further treated to produce a variety of other calcium and magnesium-containing compounds. For example, utilizing the $Ca(OH)_2$, which is obtained by contact of said oxychloride crystals with water, $Mg(OH)_2$, $CaCl_2$, and waste $CO_2$ from the calcining operation, various compounds may be produced such as: CaO, MgO, $CaCO_3$, $MgCO_3 \cdot H_2O$, $MgCO_3 \cdot 5H_2O$, $Mg(HCO_3)_2$, $MgCl_2 \cdot 6H_2O$, basic magnesium carbonates, and HCl.

The calcium oxychlorides produced by the prevent invention are of particular utility in a method of preparing magnesium hydroxide from aqueous magnesium chloride-containing brines as a precipitant for said magnesium values. In addition, these oxychlorides may be decomposed by (a) heating or (b) by contact with water, whereupon, calcium hydroxide crystals form together with a calcium chloride aqueous solution. The calcium hydroxide may, of course, be recovered as solid crystals. The calcium chloride in the aqueous phase may be recovered by evaporation or recycled for use in the present separation process.

The magnesium values recovered by way of the present novel process, as magnesium hydroxide, may be employed as a feed to a kiln in the production of magnesium oxide, carbonated to produce magnesium carbonate, or converted by a carbonation reaction in the presence of calcium chloride to $MgCl_2$ as feed to an electrolytic cell in the production of primary magnesium.

In practicing the present novel separation process, employing the preferred material, dolomite, the raw material is conventionally crushed to a convenient size such as, for example, from about 1 to about 1½ inches in cross-section, then calcined. The calcined dolomite, or dolime as it is called in the art, is slaked as described, for example, hereinfore. At least the calcium oxide portion of the dolime should be hydrated and it is not detrimental if the magnesium values are slaked as well. The slaked dolime is then reacted (that is, the slaked CaO) at a preferred temperature range of from about 0° C. to about 37° C. over an extended reaction period depending on the temperature employed, and the crystal size desired, with an aqueous $CaCl_2$ solution, the concentration of $CaCl_2$ in the aqueous portion of the reaction mass being from about 6 to about 32 percent by weight. As a result, one or a combination of hydrated calcium oxychloride complexes are formed, which upon cooling the reaction mass to a lower temperature within the above range crystallizes out as large, highly filterable crystals of a size approaching, for example, from about 50 to 200 microns. The particular calcium oxychloride hydrate obtained depends to a large extent on the combination of reaction conditions employed. For example, the calcium oxychloride hydrate $CaCl_2 \cdot 3CaO \cdot XH_2O$, (wherein X is from 14 to 16) is readily formed in dominant amounts at a temperature of from about 20° to 37° C. and a $CaCl_2$ concentration of from about 21 to 29 percent (soluble basis). At temperatures above about 20° C. and above $CaCl_2$ concentrations of about 29 percent, the lower hydrates, that is, the dihydrate and pentahydrate tend to form primarily, which produces smaller crystal sizes than the hexadecahydrate. Accordingly for ease in separation, the large hydrate is preferred. For operability of the present process, it is manifest that the various calcium oxychloride hydrates can be separated from the solid magnesium values of classification, such as by the use of different screen sizes, etc. The recovered magnesium solids can be further separated from soluble calcium impurities by washing with water, preferably and conveniently at ambient temperatures (20°–25° C.).

The reaction temperatures are critical only insofar as temperatures below about 0° C. are normally commercially unfeasible and uneconomical, and temperatures above about 37° C. are not conducive to the preferred dominant 14–16 oxychloride hydrate formation.

The calcium chloride concentration in the reaction mass, broadly speaking, is employed in a direct relationship to the reaction temperature. The range of concentration of $CaCl_2$ is critical only insofar as at lower than a 6 percent concentration the oxychlorides do not readily form unless the temperature is considerably reduced from that stated above. At greater than a 32 percent concentration, the less desirable lower hydrates of calcium oxychlorides are obtained. The calcium chloride which is reacted with the slaked dolime in accordance with the present invention should be as pure as possible as such purity aids in providing a low boron impurity level in the magnesium values recovered.

The rate of addition and/or the concentration of reactants and/or the rate of cooling of the reaction mass has an effect, on the size of the oxychloride crystal, and particularly on the size of hexadecahydrate crystal, which can be predetermined, for any given set of reaction conditions, by one skilled in the art.

From the foregoing it can be seen that an effective but simple separation and recovery of the calcium values and magnesium values in magnesium-calcium carbonate-containing materials can be accomplished by means of the present process. Moreover, the present novel method has the advantage in that processing costs are minimized since the precipitant employed, calcium chloride, is abundant, relatively low in cost, and may be recycled for use in a continuous application of the process and that magnesium values can be recovered having a low level of boron impurity, thus highly suitable for production into, for example, reactive magnesium oxide or into periclase having a low boron impurity level.

As a further embodiment of the present invention, the calcium oxychloride prepared and recovered hereinbefore, preferably the hexadecahydrate, may be employed to advantage in a method of preparing high purity magnesium hydroxide from magnesium chloride-containing brines. In this method the calcium oxychloride as aforesaid serves as a precipitant since when contacted in aqueous solution with magnesium chloride it is converted to calcium hydroxide to precipitate the magnesium as the hydroxide.

In general, the method comprises the combination of steps of reacting calcium oxychloride in an aqueous medium with an aqueous brine containing at least about 3 percent by weight of magnesium chloride at a temperature of from about 20° to about 80° C. and soluble alkalinity level of from about 3 to about 60 mls., wherein soluble alkalinity is the mls. of 0.1 N HCl required to titrate 100 ml. of filtrate to a methyl orange end point. A high purity magnesium hydroxide precipitate is thereby formed. So-formed, the magnesium hydroxide solids are separated from the liquid phase which normally comprises primarily aqueous calcium chloride, whereupon, the solids are washed, for example, with water. If desired, the magnesium hydroxide may then be fed dry or in slurry form into a rotary kiln for conversion to magnesium oxide, for example, periclase. Ordinarily, the magnesium hydroxide feed is exposed to a temperature up to about 2000° C., depending on the degree of reactivity of the resulting MgO that is desired. For periclase the temperature employed is ordinarily from about 1600° to 2000° C. In the reaction of the calcium oxychloride with the brine the soluble alkalinity level is preferably maintained at about 5 to about 20 mls., the temperature of the reaction being within a range of from about 40° to about 60° C.

The oxychloride method of preparing magnesium hydroxide provides a novel means of obtaining a substantially purer magnesium hydroxide product than heretofore possible since the lime heretofore used in precipitation was responsible for predominant amounts of impurities in the resulting $Mg(OH)_2$ product. The present novel process avoids such impurities inasmuch as the lime, in the precipitant, is essentially purified by conversion first to an oxychloride, whereupon, the impurities are readily removed by classification and washing. As a result the final magnesium hydroxide product has a very low impurity level with respect to, for example, CaO, $SiO_2$, $Al_2O_3$, and $Fe_2O_3$.

The following examples serve to illustrate the operation, utility, and the effect of various combinations of conditions of the present invention, but are not to be construed as limiting it thereto.

Example I

A quantity of Cedarville Grade Engadine No. 2 dolomite limestone was calcined to yield the oxides of calcium and magnesium (called dolime). A 1000 grams portion of the dolime was slaked in 4000 grams of an aqueous 10 percent $CaCl_2$ solution at 80° C. while stirring. Cold tap water was added as necessary to prevent the slurry from boiling and frothing over. Stirring was continued for one hour after the dolime addition after which about 1700 grams of 55 percent $CaCl_2$ in water plus 250 mls.

of tap water were added to provide a concentration of about 24 percent CaCl$_2$ (solution basis). This slurry was allowed to stand with occasional stirring for about 64 hours at 70° C. to slake, that is, convert all the solids to hydroxides. Sieving was employed to remove particles (impurities) in excess of 44 microns (325 mesh). The temperature of the slurry was then cooled slowly to 25° C. over a 5½ hour period and screened through a 325 mesh screen (U.S. Standard Sieve Series) to separate the calcium oxychlorides of substantially the hexadecahydrate from the much smaller MgO and Mg(OH)$_2$ particles. The average size of the oxychloride crystals was about 50 x 200 microns, whereas, the average size of the MgO and MG(OH)$_2$ crystals was about 0.5 x 1 micron. To assure, for laboratory purposes, complete recovery, the cooling and sieving sequence was repeated a second time. The remaining Mg(OH)$_2$ slurry may be filtered and washed to separate the Mg(OH)$_2$ from the CaCl$_2$. The calcium oxychloride crystals may, for example, be decomposed by the application of heat or by dilution with water into insoluble Ca(OH)$_2$ particles suspended in a CaCl$_2$ solution. Filtration, settling, etc. may be used for separating the Ca(OH)$_2$ from the CaCl$_2$. The CaCl$_2$ so-separated may then be recycled to an earlier step in the process.

The Mg(OH)$_2$ separated in the above manner is of high purity, especially with respect to those impurities which are normally critical limitations in commercial operations. The level of these impurities (on a calcined basis, i.e., MgO) are as follows:

Impurities on calcined basis:
```
    Cl _____percent__ 0.38
    SiO₂ _____do____ 0.51
    R₂O₃ _____do____ 0.74
    B₂O₃ _____p.p.m.__ 447
```

This Mg(OH)$_2$ when pelleted and calcined in a standard laboratory test procedure was found to have an unusually high apparent density of about 3.55 grams per cc.

Example II 1000 grams of dry dolime were added to 4000 grams of 80° C. water while stirring. The resulting slurry was stirred for one hour and then passed through a 200 mesh screen (74 micron openings). The slurry was reheated to 50° C. and 3000 grams of 55 percent CaCl$_2$ added, to bring the soluble CaCl$_2$ concentration to about 25 percent CaCl$_2$. This slurry was slowly cooled to 25° C. over a 4½ to 5 hour period. Stirring was discontinued and the dense white oxychloride crystals (CaCl$_2$·3CaO·16H$_2$O)

were allowed to settle for 5 minutes. The unsettled slurry over the calcium oxychloride crystals was decanted. The white calcium oxychloride crystals were reslurried with 500 ml. of 25 percent CaCl$_2$ (25° C.), transferred to a 325 mesh screen, and then washed with 1000 ml. of 25 percent CaCl$_2$. The washed calcium oxychloride crystals (85 percent of the theoretical yield) were then analyzed for percent acid insoluble, SiO$_2$, R$_2$O$_3$, Fe$_2$O$_3$, Al$_2$O$_3$, and CO$_2$ by standard lime methods, with the results as follows:

| Impurity level calculated on 100% CaO basis: | Percent |
|---|---|
| Acid insoluble | 0.014 |
| SiO$_2$ | 0.014 |
| R$_2$O$_3$ | 0.032 |
| Fe$_2$O$_3$ | 0.002 |
| Al$_2$O$_3$ | 0.030 |
| CO$_2$ | 0.036 |

A 300 gram brine sample containing about 9.4 percent magnesium chloride and about 17.2 percent calcium chloride was heated to 50±2° C. and the theroetical amount of the calcium oxychloride crystals prepared above was added to the brine over a one hour period. The slurry was stirred for 2 hours while maintaining the above temperature, and then filtered through a Whatman No. 40 H Filter Paper on a Buchner funnel. The wet Mg(OH)$_2$ cake was reslurried in 200 ml. of water and refiltered. This cake was washed with three 25 ml. portions of water (75 ml. of total wash H$_2$O) and then dried to constant weight at 110° C. The dried cake was analyzed for percent Mg(OH)$_2$, CaO, acid insolubles, SiO$_2$, R$_2$O$_3$, Al$_2$O$_3$, Cl and CO$_2$ with the results as follows:

| | Percent |
|---|---|
| Mg(OH)$_2$ | 98.22 |
| CaO | 0.1 |
| Acid insoluble | 0.03 |
| SiO$_2$ | 0.03 |
| R$_2$O$_3$ | 0.075 |
| Fe$_2$O$_3$ | 0.007 |
| Al$_2$O$_3$ | 0.068 |
| Cl | 0.078 |
| CO$_2$ | 0.524 |

It is manifest that the present invention may be modified and changed, particularly with respect to the reaction conditions, without departing from the spirit or scope thereof, and it is understood that the invention is only limited as defined in the appended claims.

We claim:
1. A method of separating magnesium and calcium values from a material consisting essentially of magnesium and calcium caronates which comprises the steps of: crushing the carbonate material to a particulate form; calcining said material to provide the corresponding magnesium and calcium oxides; slaking at least the calcium oxide portion of the calcinated material to calcium hydroxide; reacting the calcinated slaked material with a concentrated aqueous solution of calcium chloride, thereby to form crystals of CaCl$_2$·3CaO·$x$H$_2$O wherein $x$ ranges from 14 to 16 in an aqueous calcium chloride solution phase also containing crystals of magnesium oxide, magnesium hydroxide and mixtures thereof, said crystals of MgO and Mg(OH)$_2$ being separably smaller than said oxychloride hydrate crystals; and separating said calcium oxychloride crystals from the solution phase and from the magnesium values.

2. The method of claim 1 wherein the reaction of the calcined-slaked material with the calcium chloride solution is carried out at a temperature within the range of about 0° to 37° C.

3 The method of claim 1, wherein the reaction of the calcined-slaked material with the calcium chloride solution is carried out at a temperature of from about 20° to about 37° C. and the concentration of calcium chloride in the aqueous solution is from about 21 to about 29 percent.

4. The method of claim 1, wherein the material from which the calcium and magnesium values are to be separated is dolomite.

5. The method of claim 1, wherein the concentration of calcium chloride in the aqueous solution is from about 6 to about 32 weight percent.

6. The method of claim 1, including the additional step of: washing the magnesium oxide and hydroxide crystals so-separated.

7. A method of preparing magnesium hydroxide from a magnesium chloride-containing brine which comprises: providing dolomite mineral in a crushed form; calcining said crushed dolomite to oxides of the calcium and magnesium; slaking the calcined dolomite with a slaking solution to hydrate at least the calcium oxide portion thereof to calcium hydroxide; reacting the slaked dolomite at a temperature of from about 0° to about 37° C. with an aqueous solution containing from about 6 to about 32 weight percent of calcium chloride, thereby forming a crystalline precipitate of CaCl$_2$·3CaO·$x$H$_2$O wherein $x$ ranges from 14 to 16 in an aqueous calcium chloride phase also containing smaller solid magnesium oxide and magnesium hydroxide crystals; separating said crystalline precipitate from the solid magnesium oxide and magnesium hydroxide; containing the precipitate so-separated with an aqueous brine containing at least about 3 percent by weight of magnesium chloride at a temperature of from about 20 to about 80° C. and soluble alkalinity of from about 3 to about 60 milliliters, thereby precipitating magnesium hydroxide from said brine and providing an aqueous calcium chloride-containing mother liquor; separating said precipitated magnesium hydroxide from said calcium chloride-containing mother liquor; and washing the magnesium hydroxide so-separated.

8. The method of claim 7 wherein the reaction between the slaked dolomite and calcium chloride solution is carried out at a temperature from about 20 to about 37° C., the concentration of the calcium chloride solution is from about 21 to about 29 weight percent, the reaction between the precipitate and the brine is carried out at a temperature from about 40 to about 60° C., and the concentration of the brine is at least about 10 weight percent magnesium chloride with a soluble alkalinity of from about 5 to about 20 milliliters.

References Cited

UNITED STATES PATENTS

| | | | |
|---|---|---|---|
| 1,583,759 | 5/1926 | Mathers | 23—188 |
| 3,080,215 | 5/1963 | Waldron et al. | 23—201 |
| 3,294,485 | 12/1966 | Mayer | 23—201 XR |
| 3,301,633 | 1/1967 | Stowe et al. | 23—201 XR |

FOREIGN PATENTS

| | | |
|---|---|---|
| 20,277 | 11/1882 | Germany. |

OSCAR R. VERTIZ, *Primary Examiner.*

EDWARD STERN, *Assistant Examiner.*

U.S. Cl. X.R.

23—181, 201